United States Patent
Franz et al.

(10) Patent No.: US 10,863,413 B2
(45) Date of Patent: Dec. 8, 2020

(54) EQUIPMENT AND METHOD FOR THE WIRELESS OPERATION OF AN IO-LINK COMMUNICATION SYSTEM

(71) Applicant: Balluff GmbH, Neuhausen a.d.F. (DE)

(72) Inventors: Stephan Franz, Uhingen (DE); Matthias Beyer, Metzingen (DE); Markus Rentschler, Dettingen (DE)

(73) Assignee: Balluff GmbH, Neuhausen a.d.F. (DE)

( * ) Notice: Subject to any disclaimer, the term of this patent is extended or adjusted under 35 U.S.C. 154(b) by 25 days.

(21) Appl. No.: 16/387,826

(22) Filed: Apr. 18, 2019

(65) Prior Publication Data

US 2019/0327662 A1    Oct. 24, 2019

(30) Foreign Application Priority Data

Apr. 20, 2018   (DE) .................. 10 2018 109 607

(51) Int. Cl.
   *H04W 40/24*    (2009.01)
   *H04L 12/40*    (2006.01)
   *H04W 84/18*    (2009.01)

(52) U.S. Cl.
   CPC ....... *H04W 40/24* (2013.01); *H04L 12/40019* (2013.01); *H04L 2012/4026* (2013.01); *H04W 84/18* (2013.01)

(58) Field of Classification Search
   CPC .................. H04W 40/24; H04L 12/40019
   See application file for complete search history.

(56) References Cited

U.S. PATENT DOCUMENTS 10,127,163 B2    11/2018  Feinaeugle
2017/0352260 A1  12/2017  Saito et al.

FOREIGN PATENT DOCUMENTS

DE    10 2012 009 494 A1    11/2013

OTHER PUBLICATIONS

German Office Action dated Feb. 18, 2019 in German Application No. 10 2018 109 607.0, with English translation of relevant parts.
Publication "IO-Link Wireless System Extension—Specification"; IO-Link Community 2018, Version 1.1, Mar. 2018, Order No. 10.112; searched in the internet under URL: "https://io-link.com/share/Downloads/System-Extensions/IO-Link_Wireless_System_10112_V11_Mar18.pdf" on Feb. 14, 2019.
IEC 61131-9, Edition 1.0, Sep. 2013, "Programmable controllers—Part 9: Single-drop digital communication interface for small sensors and actuators (SDCI)," total of 576 pages.
ISO 15745-1, First edition, Mar. 1, 2003, "Industrial automation systems and integration—Open systems application ntegration framework—Part 1: Generic reference description," total of 40 pages.

(Continued)

*Primary Examiner* — Ronald B Abelson
(74) *Attorney, Agent, or Firm* — Collard & Roe, P.C.

(57) ABSTRACT

Equipment for the wireless operation of IO-link devices in an IO-link communication network, including an IO-link master connected to a fieldbus a wire-bonded communication network and at least one wirelessly communicating IO-link device, has a wire-bonded IO-link device serving as a wireless IO-link device interface for the wireless communication with the at least one wirelessly communicating IO-link device.

13 Claims, 6 Drawing Sheets

(56) References Cited

OTHER PUBLICATIONS

ISO 15745-1 Amendment 1, Apr. 1, 2007, "Industrial automation systems and integration—Open systems application ntegration framework—Part 1: Generic reference description—Amendment 1," total of 16 pages.
ISO 15745-2, First Edition, Nov. 15, 2003, "Industrial automation systems and integration—Open systems application integration framework—Part 2: Reference description for ISO 11898-based control systems," total of 170 pages.
ISO 15745-3, First Edition, Nov. 15, 2003, "Industrial automation systems and integration—Open systems application integration framework—Part 3: Reference description for IEC 61158-based control systems," total of 276 pages.
ISO 15745-4, First Edition, Nov. 15, 2003, "Industrial automation systems and integration—Open systems application integration framework—Part 4: Reference description for Ethernet-based control systems," total of 132 pages.
ISO 15745-4 Amendment 1, Feb. 15, 2006, "Industrial automation systems and integration—Open systems application integration framework—Part 4: Reference description for Ethernet-based control systems—Amendment 1: PROFINET profiles," total of 56 pages.
ISO 15745-4 Amendment 2, Feb. 1, 2007, "Industrial automation systems and integration—Open systems application integration framework—Part 4: Reference description for Ethernet-based control systems—Amendment 2: Profiles for Modbus TCP, EtherCAT and ETHERNET Powerlink," total of 174 pages.
ISO 15745-5, First Edition, Feb. 1, 2007, "Industrial automation systems and integration—Open systems application integration framework—Part 5: Reference description for HDLC-based control systems," total of 96 pages.

EQUIPMENT AND METHOD FOR THE WIRELESS OPERATION OF AN IO-LINK COMMUNICATION SYSTEM

CROSS-REFERENCE TO RELATED APPLICATIONS

This application claims priority under 35 USC 119 of German Application No. 10 2018 109 607.0, filed on Apr. 20, 2018, the disclosure of which is herein incorporated by reference.

BACKGROUND OF THE INVENTION

1. Field of the Invention

The invention relates to equipment and a method for the wireless operation of an IO-link communication system.

2. Description of the Related Art

In machine and plant engineering, as well as in automation technology, numerous standardized fieldbus systems have proved expedient as alternatives to parallel individual cabling. Here, a plurality of so-called fieldbus modules are attached to a central control device via the fieldbus. In turn, terminals are connected to the fieldbus modules.

Recently, in order to connect the terminals to the fieldbus modules, so-called "IO-link" connections are used. Such an IO-link and a method and a control device for the operation of such an IO-link emerge from DE 10 2012 009 494 A1. As described there, the fieldbus modules take on the role of an IO-link master. Sensors, actuators, display devices, operating devices, as well as drives on machines, for example, can be considered as terminals ("IO-link devices" below).

In many assembly facilities, the need for space for cabling and for switchboxes for the electro-installation often exceeds the available construction space of the handling mechanism. The costs for the working time and the material expenditure of the installation of the hardware for the signal transmission to the machine almost always exceed the purchase costs of the connected binary sensors and actuators.

In order to tackle this problem, a consortium of concerned producers specified a standard for an intelligent sensor/actuator interface with said label "IO-link", which is to be standardized as international open standard in the IEC 61131-9 Standard. Said IO-link devices are then described via description datasets IODD, IO-Link Device Description. The IODD as a descriptive language shall additionally be standardized in the ISO 15745 Standard as an open standard.

Such an IO-link provides a serial point-to-point connection for the signal transmission between sensors and actuators and the IO level of the machine. In principle, an IO-link transmits data between said IO-link master and a connected IO-link device as slave. Both fieldbus modules and SPS interface assembly groups are available as the IO-link master.

In addition, such an IO-link is compatible backwards to the binary standard sensors and continuously uses unshielded three- or five-wired standard lines. While the fieldbus level is responsible for linking individual machines or their components to the controller of the system, the IO-link is allocated to the machine- or the sensor-actuator level. Most of the standardized fieldbuses count towards the fieldbus level, as they are continuously used in machine and plant engineering.

Commonly used fieldbuses are, for example, PROFIBUS-DP, Interbus, DeviceNet, CC-Link, CC-Link IE Field, CC-Link IE Field Basic, Modbus TCP, Sercos III and CANopen. Moreover, fieldbus standards based on Ethernet, such as PROFINET, EtherNet/IP, EtherCAT, Mechatrolink, Varan, as well as Ethernet POWERLINK, have also been used recently. Fieldbuses are particularly advantageous when bridging large distances between individual participants, which can be several 100 meters to over 10 km sometimes. However, it is problematic and disadvantageous that these powerful bus systems cannot be used practically economically on the sensor/actuator level.

In the existing "IO-link Wireless System Extensions" specification, an IO-link wireless master (W-master) with a fieldbus interface is already described (see FIG. 1), i.e. an IO-link W-master having fieldbus connection. This disadvantage of this known approach lies in that such a W-master having a corresponding interface is required for each fieldbus. This is connected to a considerable technical effort and corresponding cost and time expenditure, in particular for the development and radio authorization of individual IO-link devices for said existing fieldbus technologies.

SUMMARY OF THE INVENTION

The idea underlying the invention is to implement a wireless IO-link master wirelessly communicating via a "wireless sensor and actuator network" in the form of a (wired) IO-link device. Here, there is an underlying understanding that the explicit allocation of several wireless IO-link devices is not possible because of a lack of addressing level in a (wired) IO-link system. Therefore, with a (wired) IO-link, in each case only one single IO-link device is connected to an IO-link master or master port, and the allocation is thus physically clear because of the respective IO-link connection cable.

Thus, according to the invention, a method for the wireless operation of an IO-link communication system is proposed, which solves the problem of the lack of addressing level between the wireless IO-link master, which simultaneously represents a (wire) IO-link device, and the (wired) IO-link master. This is because, by means of the inherently known wireless IO-link technology, up to 40 wireless IO-link devices can be connected to each wireless IO-link master.

Accordingly, the technical concept underlying the invention is to implement an IO-link master (W-master) as a wire-bonded IO-link (wired) device serving as an interface corresponding to an IO-link device. In order to solve said problem of the address space accessible for this, the alternative methods described below or operating processes are proposed.

With the equipment according to the invention for the wireless operation of IO-link devices in an IO-link communication network, in which an IO-link master connected to a fieldbus through a wire-bonded communication connection and at least one wirelessly communicating IO-link device are provided, it is particularly provided that a wire-bonded IO-link device serving as a wireless IO-link device interface for the wireless communication with the at least one wirelessly communicating IO-link device is arranged.

The proposed wireless IO-link device interface can be provided by a W-master formed with a wire-bonded IO-link device in a unit or by an additional wire-bonded IO-link master, also formed in a unit with a wire-bonded IO-link device. The unit mentioned last can be communicatively connected with an IO-link master via a wire-bonded IO-link connection, wherein the communication of the IO-link device formed in this unit with the wirelessly communicating IO-link device takes place via respective, wire-bonded IO-link communication connections.

The proposed wireless IO-link device interface can also be provided by an IO-link device, which, in turn, is formed in a unit with a wire-bonded IO-link master and a wireless IO-link master (W-master). Here, the wireless IO-link device interface formed in this way can communicate via a wireless IO-link communication track with the at least one wirelessly communicating IO-link device, and the wireless IO-link device interface formed in this way can communicate via a wire-bonded IO-link communication track with at least one wire-bonded IO-link device by means of the integrated IO-link master. In addition, it can be provided here that the wireless IO-link device communicates with a user interface of at least one additional wireless IO-link master (W-master) via the wire-bonded IO-link communication track by means of the IO-link master integrated here.

The proposed wireless IO-link device interface can furthermore be provided by a wireless IO-link master, which communicates with at least one wirelessly communicating IO-link device via a wireless IO-link communication connection and provides a wire-bonded IO-link communication with at least one wire-bonded IO-link device via an IO-link master formed from a wirelessly communicating IO-link device and formed, in turn, in a unit.

In relation to the method according to the invention, it shall firstly be noted that the methods described below are also suitable for implementing an IO-link wired master as an IO-link wired device or an IO-link master as an IO-link wireless device. In addition, combinations of these alternatives are also possible. Thus, a wireless master and a wired master can be integrated together in an IO-link device. This is advantageous, for example, in order to be able to simply configure a W-master related here via an IO-link HMI (human-machine interface).

According to an embodiment of the method according to the invention, process data already present in the IO-link system for the wire-bonded communication between a wired IO-link master and a wired IO-link device can be underlying. As a result, a wirelessly communicating wireless IO-link master working like a real IO-link device can be formed.

But now the process data are limited to 32 bytes between a (wired) IO-link master and a (wired) IO-link device. If a wireless IO-link master is implemented as a (wired) IO-link device, the sum of the process data of all wireless IO-link devices is thus limited to 32 bytes. In addition, a necessary addressing of the process data between (wired) IO-link master and (wired) IO-link device is lacking, which allows for an allocation of the process data to the individual wireless IO-link devices. Therefore, with the proposed method according to the invention, the process data of the individual wireless IO-link devices are joined together (e.g. by means of "multiplexing") and transferred as a data telegram from the (wired) IO-link device to the (wired) IO-link master. The correspondingly required separating ("demultiplexing") of the process data transferred from the individual wireless IO-link devices can take place in the wired IO-link master or in higher levels, for example in a function module (FB) of a memory-programmable controller (SPS or PLC="programmable logic controller") often present in an IO-link system.

Thus, there are 32 bytes of process data available for all wireless IO-link devices. Here, the allocation of the individual wireless devices is implemented by a masking inside the process data. The corresponding demasking takes place, for example, in said functional module (FB).

Alternatively, the demasking of masked process data is carried out in a wire-bonded IO-link master. Here, virtual ports emerge on the wire-boned (wired) IO-link master, which appear out of the SPS view as ports of the wired IO-link master. The number of the ports of the wired IO-link master here increases by the number of the ports of the wireless IO-link master. A functional module is not required here. In this case, the IO-link master also serves the mechanisms of the event FIFOs and the parameter postbox or the alternative parameter routing by the data being allocated to the corresponding virtual port.

According to a further embodiment of the method according to the invention, the expansion of the address space for the acyclic data is obtained by means of routing of parameters. Here, the starting point is that all IO-link devices occupy the whole address region formed from an index and a sub-index. Thus, here, the allocation to an individual wireless IO-link device is also missing, such that all parameters firstly have an individual wireless IO-link master as the target address. Here, a parameter of the wireless IO-link master is used for routing of parameters. In order to send a parameter to a wireless device, firstly a corresponding target "wireless device number" is written onto the corresponding routing parameter. Then, the parameter is automatically forwarded from the wireless master to the wireless device. If the routing parameter has the value '0', it is a parameter for the wireless IO-link master. The routing can be correspondingly introduced in said FB, for example.

According to a further embodiment of the method according to the invention or as an alternative to said routing of acyclic data, the expansion of the address space takes place by means of a postbox mechanism. In order to obtain access to the parameter of the W-device, a "postbox" in the parameter space of the W-master/wired device is generated for the W-device. Here, parameters accesses are always initiated from an SPS level. In the postbox, the desired W-device port, the index and sub-index of the desired parameter, the reading/writing direction, and, with a writing process, the data, are deposited in postboxes with different indices. The W-master then sends the parameters to the corresponding W-device or reads the parameters from the W-device and deposits them in the respective postbox. In order to avoid collisions, the status of each of the postboxes can be read with a separate index.

According to a further embodiment of the method according to the invention, the address space available for events is enlarged. Because, even with events, the required allocation to an individual wireless IO-link device is lacking. In an event FIFO ("first-in/first-out" push-down stack), stored events of W-devices are passed on to the wired IO-link master via an event FIFO mechanism. If a W-device reports an event to a W-master, the W-master sends a "Device Specific Event" to the wired IO-link master, which then reads the FIFO memory. If there are several events of one or of various W-devices, these are stored in an event memory arranged with the W-master and transferred one after the other to the wired IO-link master.

BRIEF DESCRIPTION OF THE DRAWINGS

Exemplary embodiments of the invention are depicted in the drawings and explained in more detail in the description below.

Here are shown.

DETAILED DESCRIPTION OF THE PREFERRED EMBODIMENTS

Figure 1:
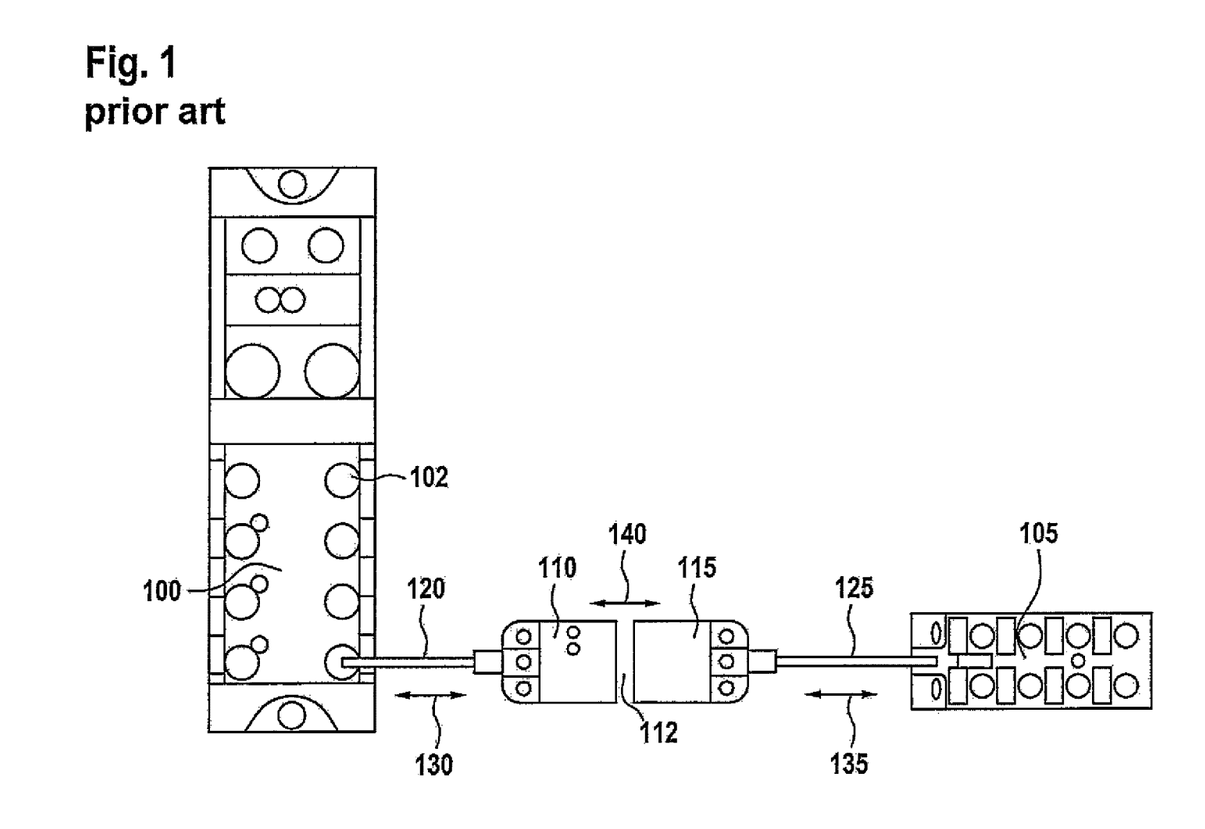
FIG. 1 shows an IO-link transfer system according to the prior art.

The transfer system shown in FIG. 1 comprises an IO-link master 100 and an IO-link device 105 communicating with the IO-link master 100. In this exemplary embodiment, the IO-link master 100 provides eight IO-link master ports, e.g. the port 102. In this exemplary embodiment, the IO-link shown comprises, in particular, two BIC couplers 110, 115 communicating contactlessly with each other, which inductively exchange data in an inherently known manner via an air transfer 112. This data exchange takes place bidirectionally according to the double arrows 130, 135, 140.

The first coupler 110 ("base" coupler) allocated to the IO-link master 100 is connected to the master 100 via a wire- or cable-bonded line 120. The second coupler 115 allocated to the IO-link device 105 ("remote" coupler) is also communicatively connected to this device 105 via a cable-bonded line 125.

In FIGS. 2 to 6 described below, corresponding features are provided with identical reference numerals in terms of the technology of the equipment or functionally.

Figure 2:
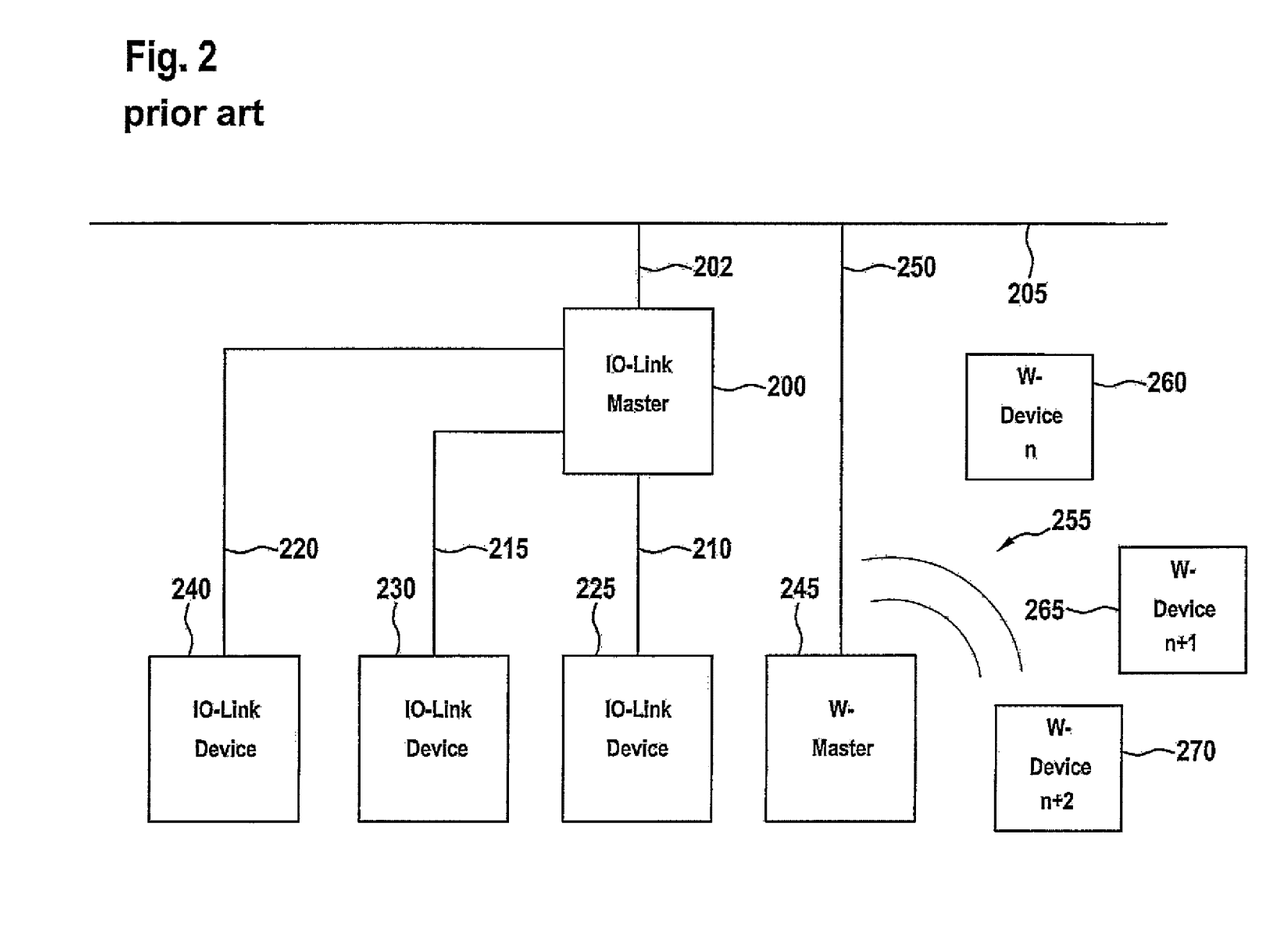
FIG. 2 shows an approach described in the known "IO-link Wireless System Extensions" specification for wirelessly operating an IO-link communication system related here.

FIG. 2 shows an IO-link topology known in the prior art, in which, in addition to a ("wired") IO-link master 200 connected to a fieldbus 205 (e.g. "PROFINET") via a wire-bonded communication connection 202, a "wireless" IO-link master 245 (W-master) is also attached to the fieldbus 205 via a separate wire-bonded communication connection 250. In the present exemplary embodiment, three IO-link devices 225, 230, 240 are additionally communicatively connected via wire lines 210, 215, 220 to the IO-link master 200. In the present exemplary embodiment, the W-master 245 communicates with three "wireless" IO-link devices 260, 265, 270 (W-devices) via a wireless "IO-link Wireless" communication connection 255.

In contrast to this, a W-master shown in FIG. 2 is intended to produce wireless connections to a plurality of "wireless" IO-link devices 260, 265, 270 (W-devices) point-to-point according to a "star topology". In order to be able to implement a W-master 245 depicted in FIG. 2 as an IO-link device, the addressing level is missing in order to be able to address the plurality of W-devices, which are subordinate to the W-master. This problem can be solved by the different methods described below, which take place separately for cyclic data (process data) and for acyclic data.

Figure 3:
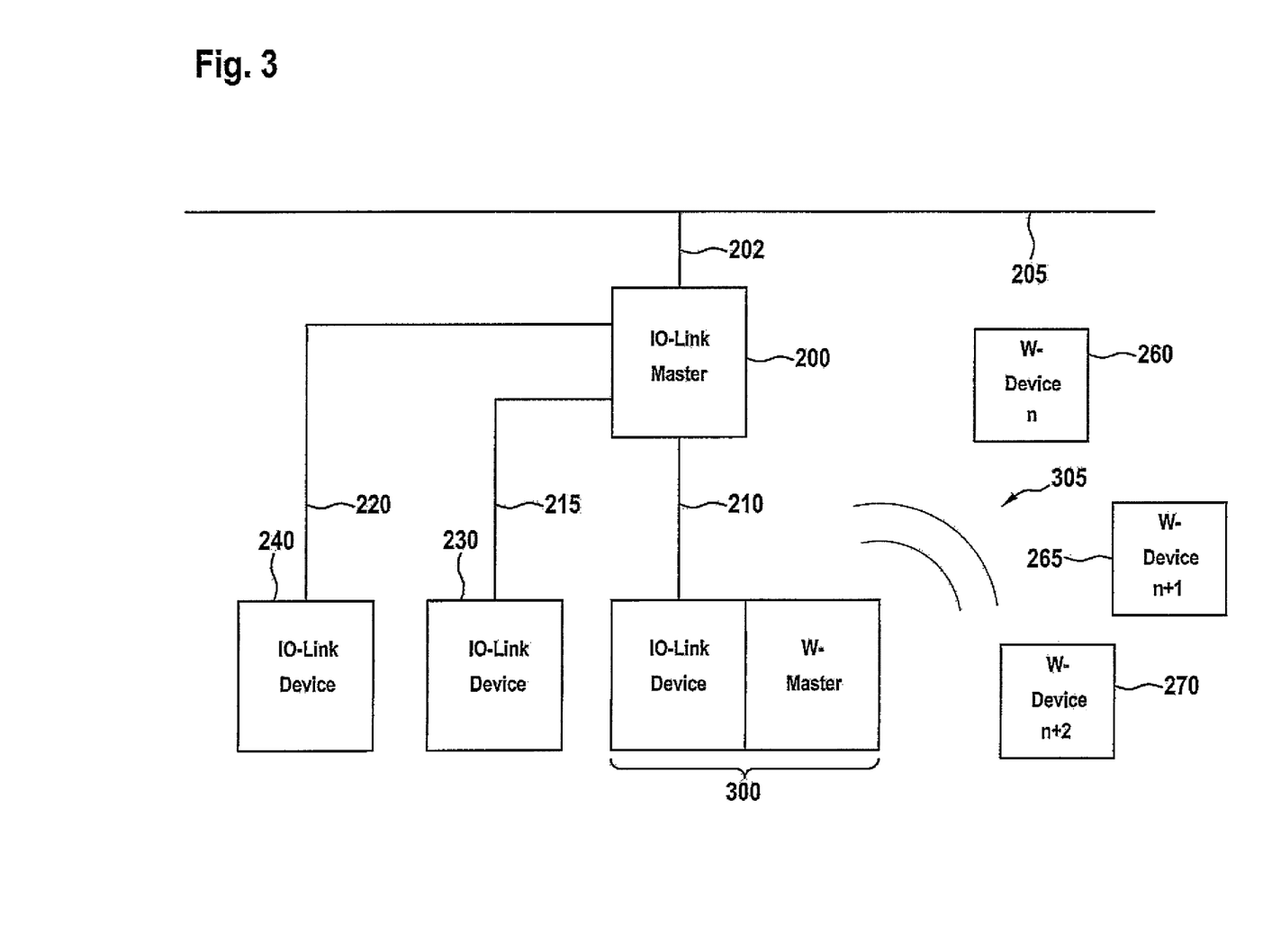
FIG. 3 shows a first exemplary embodiment of equipment according to the invention for the wireless operation of an IO-link communication system related here.

In FIG. 3, an IO-link topology according to the invention is depicted, in which a W-master is formed as an IO-link "wired" device. For this purpose, the W-master is formed as a unit 300 with an IO-link device and is connected to a "wired" IO-link master 200 via a wire-bonded IO-link communication connection 210. In this exemplary embodiment, the "wired" IO-link master 200 is also attached to the fieldbus 205 (e.g. PROFINET). The IO-link device 300 thus formed as a unit enables a wireless IO-link communication 305 ("IO-link Wireless") with the three wirelessly connected W-devices 260, 265, 270.

As preferred alternative solutions for (address-based) routing of parameters and events, the inherently known "postbox mechanism" (first exemplary embodiment of the method according to the invention) and the "event FIFO" approach also inherently known (second exemplary embodiment of the method according to the invention) are described below.

In order to obtain access to the parameters of the W-devices 260, 265, 270, a "postbox" in the parameter space of the W-master/wired device is generated for the W-devices. Parameter accesses are always initiated from the SPS level. In the postbox, the desired W-device port, the index and sub-index of the desired parameter, the reading/writing direction, and, with writing, the data are stored in various indices. The W-master 245, 300 then sends the parameters to the corresponding W-device 260, 265 or 270 or reads the parameters from the W-device and stores them in the postbox. In order to avoid collisions, the status of the postbox can be read on a separate index.

With the postbox depicted exemplarily in Table 1 below, from an index 0x200, the corresponding sub-index 0x01 of the wireless IO-link device is to be read on the w-port '22'. The request is forwarded by the wireless master to the wireless device '22' and the answer, '0x12345678' in this example, is stored in the postbox. As soon as the reading process is concluded, the state of the postbox ("postbox state") changes from "in progress" to "done".

TABLE 1

| Index | Function | Type | Example |
|-------|----------|------|---------|
| 0x40 | w-Port | r/w | 22 |
| 0x41 | Index W-Device | r/w | 0x200 |
| 0x42 | Sub-index W- | r/w | 0x01 |
| 0x43 | Data | r/w | 0x12345678 |
| 0x44 | Direction | w | read |
| 0x45 | postbox state | r | in progress, done, error, unused |

Events of W-devices 260, 265, 270, underlying an event FIFO, are forwarded to the wired master via an event FIFO mechanism. If a W-device reports an event to the W-master, then this W-device sends a "Device Specific Event" to the wired master, which then reads the FIFO memory. If there are now several events, also from different W-devices, then these are stored in an event memory of the W-master and transferred one after the other to the wired IO-link master.

In Table 2 below, the reading interface of such an event FIFO is exemplarily depicted, and that is for an event generated by a wireless IO-link device '5'. As soon as the event code, in this example 0x112233, has been read, the next event (if present) stored in the wireless master would be moved up for reading.

TABLE 2

| Address | | Content | Example |
|---------|---|---------|---------|
| Index | 0x50 | | |
| Sub-index | 0x01 | Type | 0x01 = Device |

TABLE 2-continued

| Address | | Content | Example |
|---|---|---|---|
| Sub-index | 0x02 | w-Port | 5 |
| Sub-index | 0x03 | Event Code | 0x112233 |

Figure 4:
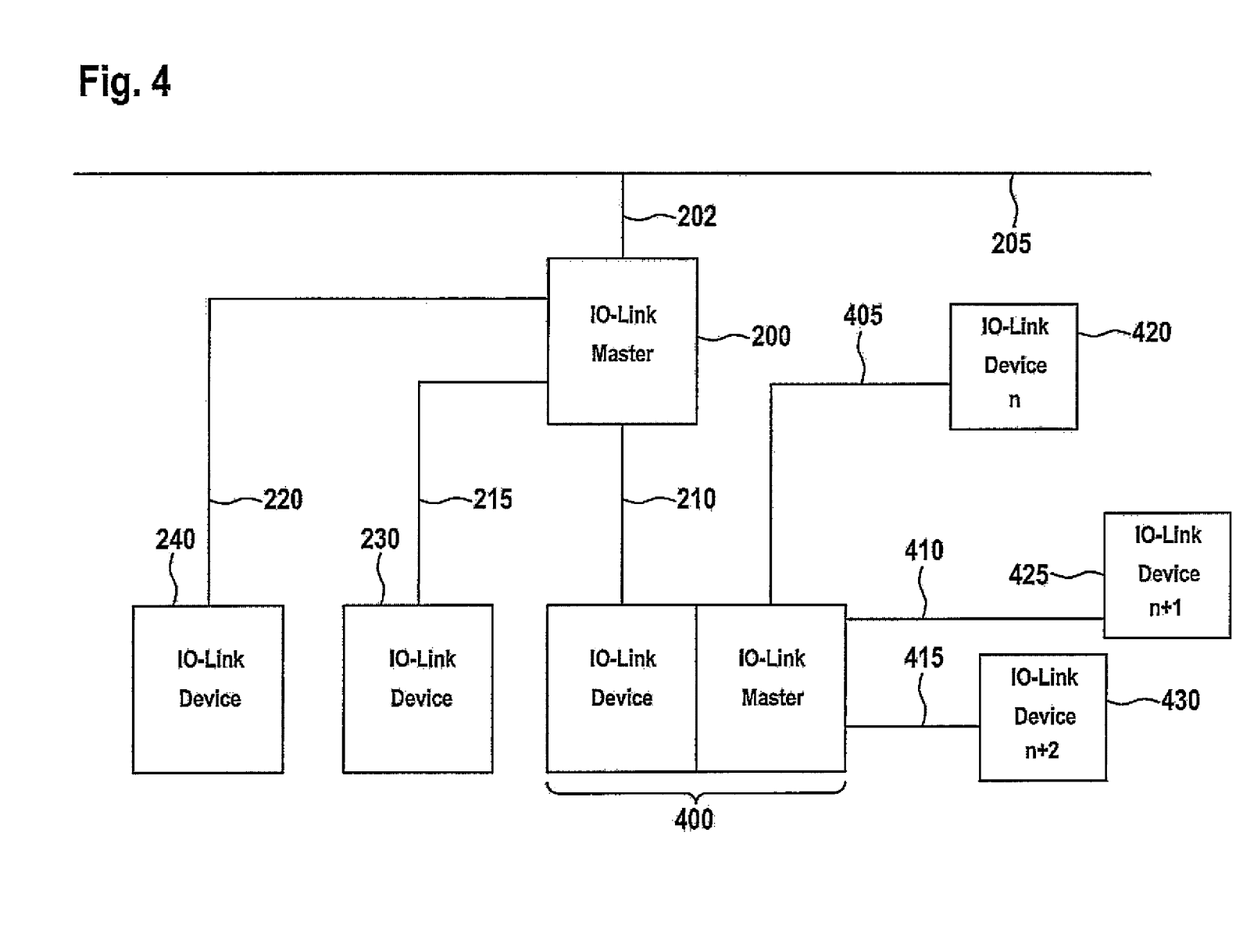
FIG. 4 shows a second exemplary embodiment of said equipment according to the invention.

In FIG. 4, a second exemplary embodiment of the IO-link device according to the invention or corresponding topology is shown, in which an additional "wired" IO-link master is formed in a unit 400 with an IO-link "wired" device, and the IO-link device 400 formed in this way is connected to the IO-link master 200 via a wire-bonded IO-link connection 210. Also in this exemplary embodiment, the IO-link master 200 is attached to a fieldbus 205, e.g. PROFINET, via the wire connection 202.

The IO-link communication of the IO-link device 400 formed in the unit with the IO-link devices 420, 425, 430 takes place respectively via wire-bonded IO-link communication connections 405, 410, 415 in this exemplary embodiment.

Figure 5:
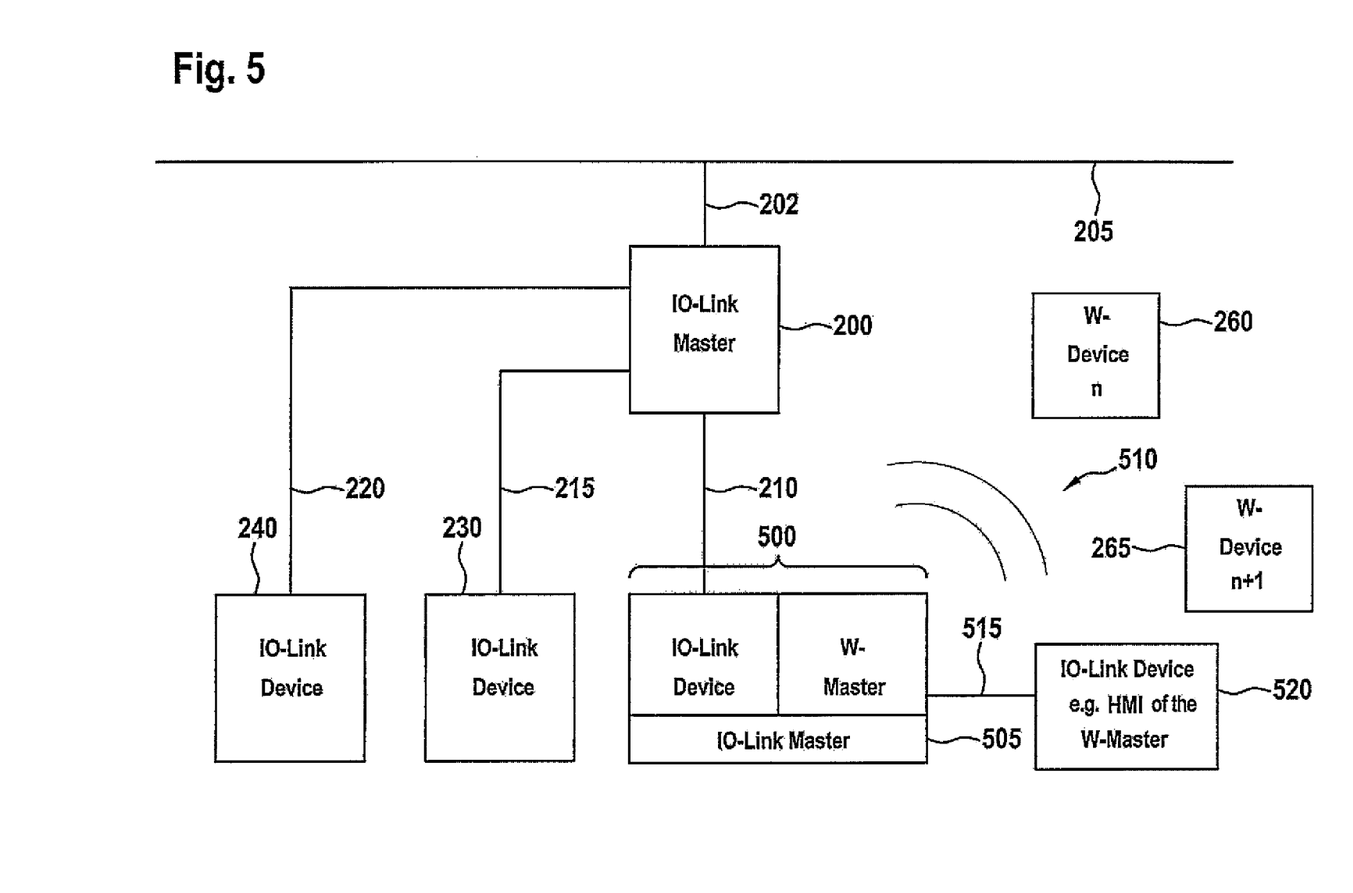
FIG. 5 shows a third exemplary embodiment of said equipment according to the invention.

In the third exemplary embodiment of the IO-link device according to the invention or corresponding topology shown in FIG. 5, an IO-link device is formed in the unit 500 both with a "wired" IO-link master 505 and with a "wireless" IO-link master (W-master). The IO-link device 500 formed in the unit 500, 505 presently communicates with two W-devices 260, 265 via a wireless "IO-link wireless" communication track 510.

In addition, the unit 500 communicates with a "wired" IO-link device 520, e.g. with a user interface ("Human Machine Interface") of the W-master of the unit 500 via a wire-bonded IO-link communication track 515 by means of an IO-link master 505 integrated therein.

Figure 6:
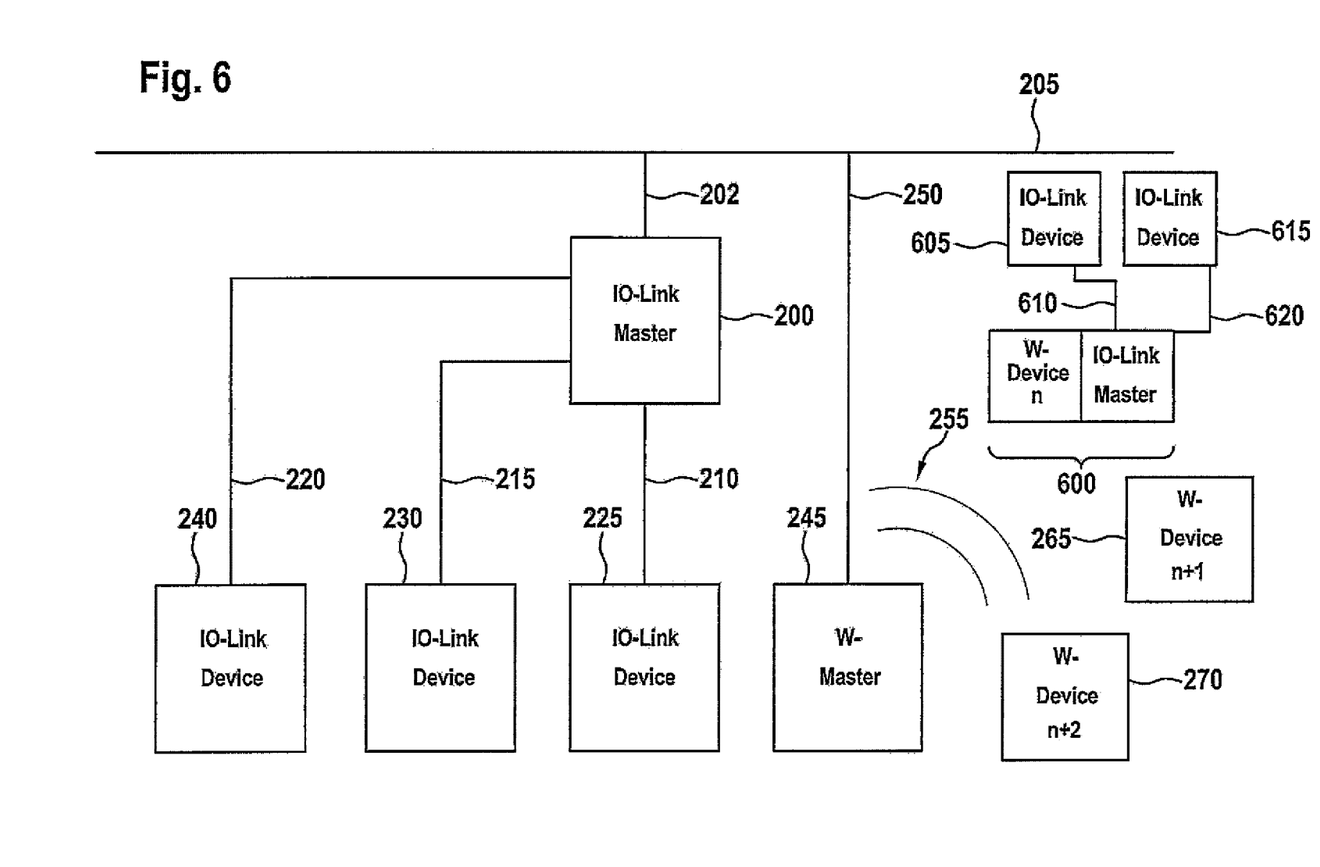
FIG. 6 shows a fourth exemplary embodiment of said equipment according to the invention.

In the fourth exemplary embodiment of the IO-link device according to the invention or corresponding topology shown in FIG. 6, in turn, a W-master 245 shown in FIG. 2 is provided. In this exemplary embodiment, the W-master 245 communicates with two (common) W-devices 265, 270 and with a unit 600 formed from a W-device and an IO-link master via a wireless "IO-link wireless" connection 255. A wire-bonded IO-link communication that is guided via two IO-link connections 610, 620 with two presently "wired" IO-link devices 605, 615 takes place by means of the IO-link master of this IO-link device 600 formed in the unit.

What is claimed is:

1. Equipment for the wireless operation of IO-link devices in an IO-link communication network, in which an IO-link master connected to a fieldbus by a wire-bonded communication connection and at least one wirelessly communicating IO-link device are provided,
    wherein a wire-bonded IO-link device serving as a wireless IO-link device interface for the wireless communication with the at least one wirelessly communicating IO-link device is provided, and
    wherein the IO-link device interface is provided by an additional wire-bonded IO-link master formed in a second unit with a wire-bonded IO-link device.

2. Equipment according to claim 1, wherein the wireless IO-link device interface is provided by a W-master formed with a wire-bonded IO-link device in a first unit.

3. Equipment according to claim 1, wherein the second unit is communicatively connected to the IO-link master via a wire-bonded IO-link connection, wherein the communication of the IO-link device formed in the second unit (400) with the communicating IO-link devices takes place via respective wire-bonded IO-link communication connections.

4. Equipment for the wireless operation of IO-link devices in an IO-link communication network, in which an IO-link master connected to a fieldbus by a wire-bonded communication connection and at least one wirelessly communicating IO-link device are provided,
    wherein a wire-bonded IO-link device serving as a wireless IO-link device interface for the wireless communication with the at least one wirelessly communicating IO-link device is provided,
    wherein the wireless IO-link device interface is provided by an IO-link device, which is formed in a third unit with a wire-bonded IO-link master and a wireless IO-link master,
    wherein the wireless IO-link device interface formed in this way communicates with the at least one wirelessly communicating IO-link device via a wireless IO-link communication track, and
    wherein the wireless IO-link device interface formed in such a way communicates with at least one wire-bonded IO-link device via a wire-bonded IO-link communication track by means of the integrated IO-link master.

5. A method for operating equipment for the wireless operation of IO-link devices in an IO-link communication network, in which an IO-link master connected to a fieldbus by a wire-bonded communication connection and at least one wirelessly communicating IO-link device are provided,
    wherein a wire-bonded IO-link device serving as a wireless IO-link device interface for the wireless communication with the at least one wirelessly communicating IO-link device is provided, and
    wherein the address space required for the wireless IO-link communication with the at least one wirelessly communicating IO-link device is generated by present process data already being used for the wireless communication between a wire-bonded IO-link master and a wireless IO-link device in the IO-link communication network.

6. The method according to claim 5, wherein the allocation of the communication with the at least one wirelessly communicating IO-link device takes place via a masking inside the process data.

7. The method according to claim 6, wherein the demasking of masked process data is carried out in a functional module of a memory-programmable controller present in an IO-link communication network.

8. The method according to claim 6, wherein the demasking of masked process data is carried out in a wire-bonded IO-link master.

9. A method for operating equipment for the wireless operation of IO-link devices in an IO-link communication network, in which an IO-link master connected to a fieldbus by a wire-bonded communication connection and at least one wirelessly communicating IO-link device are provided,
    wherein a wire-bonded IO-link device serving as a wireless IO-link device interface for the wireless communication with the at least one wirelessly communicating IO-link device is provided, and
    wherein the address space required for the wireless IO-link communication with the at least one wirelessly communicating IO-link device is generated by means of routing of parameters.

10. A method for operating equipment for the wireless operation of IO-link devices in an IO-link communication network, in which an IO-link master connected to a fieldbus by a wire-bonded communication connection and at least one wirelessly communicating IO-link device are provided, wherein a wire-bonded IO-link device serving as a wireless IO-link device interface for the wireless communication with the at least one wirelessly communicating IO-link device is provided, and wherein the address space required for the wireless IO-link communication with the at least one wirelessly communicating IO-link device is generated by means of a postbox mechanism.

11. A method for operating equipment for the wireless operation of IO-link devices in an IO-link communication network, in which an IO-link master connected to a fieldbus by a wire-bonded communication connection and at least one wirelessly communicating IO-link device are provided, wherein a wire-bonded IO-link device serving as a wireless IO-link device interface for the wireless communication with the at least one wirelessly communicating IO-link device is provided, and wherein the address space required for the wireless IO-link communication with the at least one wirelessly communicating IO-link device is generated by means of an event FIFO memory.

12. Equipment according to claim 4, wherein the wireless IO-link device interface communicates with a user interface of at least one additional wireless IO-link master via the wire-bonded IO-link communication track by means of the integrated IO-link master.

13. Equipment for the wireless operation of IO-link devices in an IO-link communication network, in which an IO-link master connected to a fieldbus by a wire-bonded communication connection and at least one wirelessly communicating IO-link device are provided, wherein a wire-bonded IO-link device serving as a wireless IO-link device interface for the wireless communication with the at least one wirelessly communicating IO-link device is provided, wherein the wireless IO-link device interface is provided by a wireless IO-link master, which communicates with at least one wirelessly communicating IO-link device via a wireless IO-link communication connection and provides a wire-bonded IO-link communication connection to at least one wire-bonded IO-link device via an IO-link master formed from a wirelessly communicating IO-link device and an IO-link master formed in a fourth unit.

* * * * *